US009596096B2

(12) United States Patent
Taylor

(10) Patent No.: US 9,596,096 B2
(45) Date of Patent: Mar. 14, 2017

(54) NAVIGATION CROWD SOURCING BASED ON LTE MULTICAST

(71) Applicant: Verizon Patent and Licensing Inc., Arlington, VA (US)

(72) Inventor: Thomas Steven Taylor, Atlanta, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 124 days.

(21) Appl. No.: 14/486,703

(22) Filed: Sep. 15, 2014

(65) Prior Publication Data

US 2016/0080163 A1    Mar. 17, 2016

(51) Int. Cl.
  *H04L 12/18*   (2006.01)
  *H04W 4/02*   (2009.01)
  *H04L 12/58*   (2006.01)
  *H04W 76/00*   (2009.01)
  *H04W 84/00*   (2009.01)

(52) U.S. Cl.
  CPC ............ *H04L 12/189* (2013.01); *H04L 51/20* (2013.01); *H04L 51/38* (2013.01); *H04W 4/02* (2013.01); *H04W 76/002* (2013.01); *H04W 84/005* (2013.01)

(58) Field of Classification Search
  CPC ....... H04L 12/189; H04L 51/38; H04L 51/20; H04W 4/02; H04W 68/005; H04W 68/04; H04W 84/005
  See application file for complete search history.

(56) References Cited

U.S. PATENT DOCUMENTS

2013/0111520 A1*  5/2013  Lo .................. H04L 67/306
                                                 725/35
2015/0170522 A1*  6/2015  Noh ................ G08G 1/096741
                                                 701/117

OTHER PUBLICATIONS

"3rd Generation Partnership Project", TS 23.246 V12.2.0, Jun. 2014.
Brouwer, "CTO Public Safety LTE", eMBMS, Alcatel-Lucent, May 2013.
Lohmar, et al., "Delivering content with LTE Broadcast", Ericsson Review, Feb. 11, 2013.

* cited by examiner

*Primary Examiner* — Jianye Wu

(57) ABSTRACT

A method for providing crowd sourced navigation alerts including receiving, at a User Equipment (UE), an Multimedia Broadcast Multicast Service (MBMS) start session message when the UE is located within a predefined MBMS area. The method may further include receiving traffic message data, which includes information regarding at least one traffic event, over the MBMS session, where the traffic message data may be based on at least one traffic notification provided by at least one second UE. The method may also include comparing a distance from the UE to a position of the at least one traffic event described in the traffic message data to at least one threshold, and providing at least one alert associated with the at least one traffic event based on the comparing.

20 Claims, 8 Drawing Sheets

NAVIGATION CROWD SOURCING BASED ON LTE MULTICAST

BACKGROUND

Mobile wireless devices have traditionally included some form of position determination capability to assist users with navigational tasks. More recent developments include social navigation techniques which further leverage the wireless communications network to supplement position data with additional information provided by other users within the network. However, mobile wireless communication systems have finite resources shared among different users and a variety of services, and conventional social navigation approaches can consume a significant amount of wireless network resources.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to navigation devices which may use information derived from crowd sourcing. In an embodiment, crowd sourced information may include data obtained through various broadcasting features provided through Long Term Evolution (LTE) wireless standards (e.g., LTE, LTE Advanced, etc.). Vehicles equipped with mobile devices may receive traffic notifications and send traffic alerts from/to a Navigation Crowd Sourcing System (NCSS) over a LTE wireless network. The NCSS may consolidate and analyze received traffic notifications over standard LTE wireless channels. Based on the received notifications, the NCSS may provide traffic alerts to vehicles in the appropriate geographic regions using LTE's broadcasting and/or multicasting standards. The geographic regions may be determined based on position information which may be included and/or inferred based on the structure of the LTE wireless network. The LTE broadcasting and/or multicasting standards may include Multimedia Broadcast Multicast System (MBMS) standards, such as, for example, the evolved Multimedia Broadcast Multicast System (eMBMS) standard. MBMS provides an efficient mechanism to deliver common content over LTE networks which may be directed to targeted service areas. MBMS allows the broadcast/multicast service areas to vary in size, and include venue specific areas (e.g., an arena), region specific areas, and nationwide areas. The MBMS standard permits flexible control of the service areas to provide information to groups in an efficient manner, as multicast makes more efficient use of the available network resources (e.g., wireless spectrum).

Figure 1:
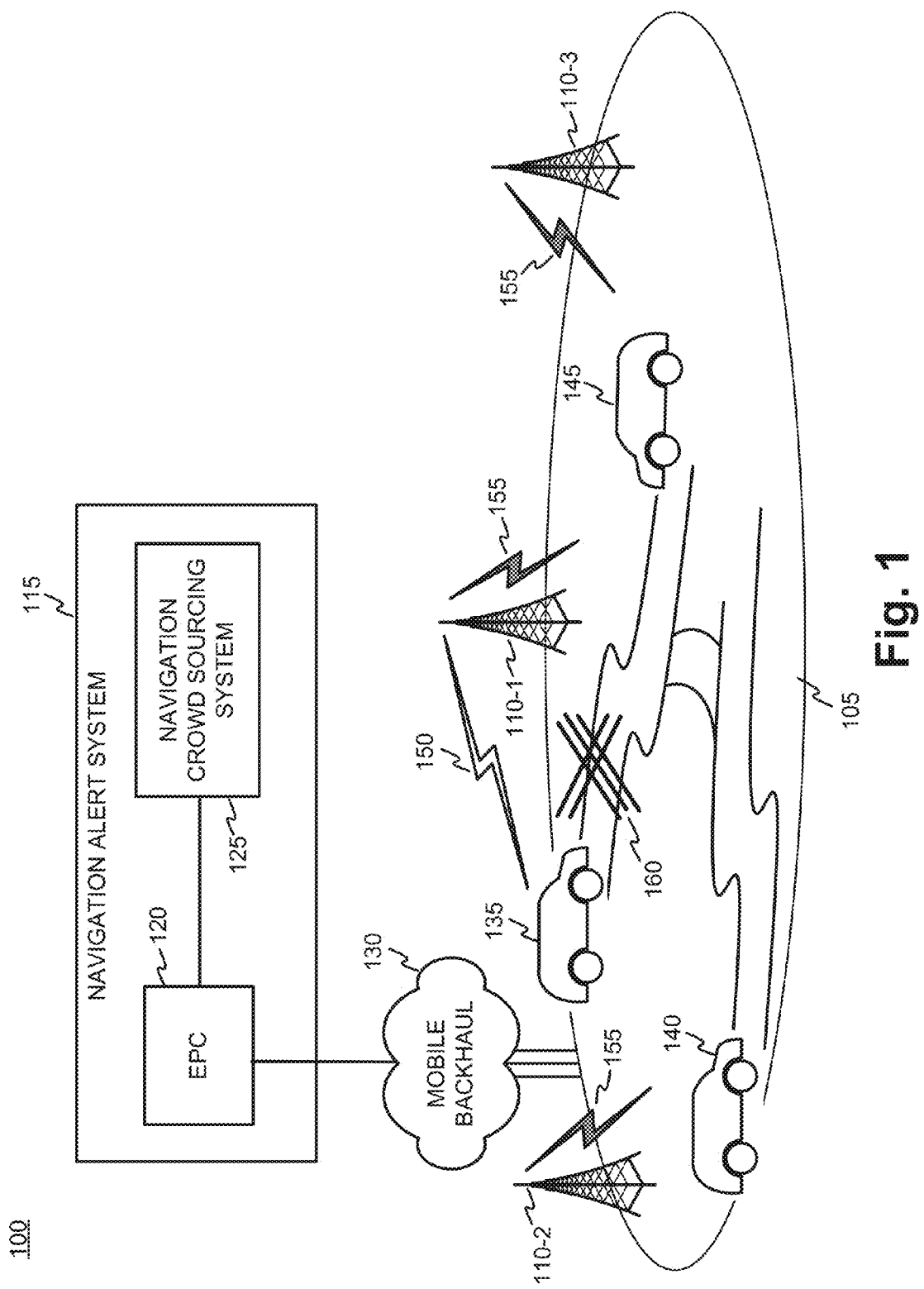
FIG. 1 is a diagram showing an exemplary environment associated with a navigation alert system (NAS)

FIG. 1 a diagram showing an exemplary environment 100 associated with a navigation alert system. Environment 100 may include an MBMS area 105, eNodeBs 110 (herein referred to plurally as "eNodeBs 110," generically as "eNodeB 110," and individually as "eNodeB 110-x"), a Navigation Alert System (NAS) 115, a mobile backhaul 130, and vehicles 135-145. NAS 115 may further include Extended Packet Core (EPC 120) and Navigation Crowd Sourcing System (NCSS) 125. While the embodiment shown in FIG. 1 uses an LTE based system to provide MBMS (e.g., eMBMS) traffic alerts, other multicast and/or broadcast approaches/wireless standards may be used in other embodiments. For example, MBMS techniques associated with Global System for Mobile (GSM) standards may be used in other implementations.

In an embodiment, MBMS area 105 may include the cells associated with a group of eNodeBs 110 which are coordinated to provide multicast transmissions to vehicles 135-145. Multicast transmissions may be provided using a simulcast technique that sends similar waveforms at substantially the same time from multiple eNodeBs 110. Vehicles 135-145 in MBMS area 105, which are equipped with the appropriate User Equipment (UE) devices as described below in reference to FIG. 2, may receive the multicast transmissions which include multicast traffic alerts 155. In an embodiment, multicast traffic alerts 155 may be only be decoded by vehicles having a registered service account with, for example, NCSS 125. Embodiments may provide multicast transmissions 155 in accordance, for example, with LTE's eMBMS standard, and MBMS area 105 may be a Multimedia Broadcast over a Single Frequency Network (MBSFN) area. MBSFN multicast provides an efficient approach to deliver the traffic alerts over LTE, where Orthogonal Frequency Division Multiplexed (OFDM) signals enhance gain from signal frequency network transmission. Efficient signal combining at the UE receivers in vehicles 135-145 may achieve high operating Signal-to-Noise Ratios (SNRs). As used herein, an MBSFN area may include a group of eNodeBs (e.g, eNodeBs 110), along with their associated cells, which are coordinated to transmit substantially identical waveforms at the approximately same time. The coordinated transmission may be "seen" as a single transmission by the UEs located in the MBSFN area.

Multicast traffic alerts 155 may be provided by NAS 115 in response to receiving traffic notification(s) that include information regarding traffic events. Such information may include text, image, audio/video, position, and/or velocity information about any traffic event and/or the vehicle providing the notification in MBMS area 105. A traffic event may include, for example, an accident, a road block, traffic congestion, construction, etc. A traffic notification may be transmitted to the NAS 115 in a unicast message from a UE equipped vehicle. Because traffic notifications may be provided by one or more vehicles 135-145, the information regarding the traffic events is crowd sourced, and thus may be used by NAS 115 to provide timely traffic alerts to other drivers observing the event in MBMS area 105.

For example, as shown in FIG. 1, while driving in MBMS area 105, vehicle 135 may encounter a hazard 160 blocking the road on which vehicle 135 is travelling. Using a UE in vehicle 135, a driver may initiate the UE to generate and transmit a traffic notification 150. The traffic notification may be wirelessly transmitted to eNodeB 110-1 by the UE in a unicast message. The traffic notification 150 may include an event description of hazard 160 (via text data and/or a numerical code) and/or the position and/or velocity of vehicle 135. The traffic notification 150 may further include other information (e.g., an image or a video of hazard 160) obtained through sensors associated with the UE. ENodeB 110-1 may send the traffic notification to NAS 115 via mobile backhaul 130. EPC 120 may receive traffic notification 150, and forward the traffic notification 150 to NCSS 125. NCSS 125 may analyze the traffic notification 150 in terms of the type of hazard, the velocity of vehicle 135, and any other information in the notification to classify the traffic event. NCSS 125 may further determine and consolidate traffic notifications received from other vehicles within a vicinity of hazard 160 to further classify the event.

Based on the classification, the NCSS 125 may generate a traffic alert which may include an approximate position (based on the vehicle position(s) included in the traffic notification(s)) of hazard 160, and the geographic impact hazard 160 may have on the surrounding road system. The geographic impact may be determined by the number of traffic notifications received, along with the event, position, and/or velocity information included therewith. For example, if hazard 160 creates traffic backups, other notifications may be received from vehicles further away indicating backups are being experienced. NCSS 125 may, based on the positions, velocities, and event descriptions, determine if different traffic notifications are causal or interrelated. Such a determination may be used to suggest a size for the MBMS area 105.

NCSS 125 may then generate a traffic alert, which may include the approximate position of hazard 160, and a suggested size for the MBMS area. The traffic alert may include any other data (event descriptions, image, and/or video data) provided in traffic notification 150. The traffic alert may further include an identifier associating it with traffic notification 150, which was responsible for the generation of the traffic alert. The traffic alert may be provided to EPC 120 for transmission over the network using MBMS protocols. In doing so, EPC 120 may first determine the actual MBMS area 105 based on the suggested size and/or position of hazard 160, and determine which eNodeBs 110 will be involved in the MBMS transmission of the traffic alert. EPC 120 may generate the proper MBMS data and control signals, and provide the messages to eNodeBs 110 to transmit multicast traffic alerts 155 to vehicles 135-145. Vehicles 135-145 may be specifically identified as members of a traffic notification service by NCSS 125, and thus are authorized to receive and decode the multicast traffic alerts 155. In an embodiment, the UE in vehicle 135 may ignore the traffic alert upon determining that the identifier therein is associated with the traffic notification 150 that was previously sent by vehicle 135.

Using MBMS to provide traffic alerts 155 permits efficient use of radio resources, as vehicles which receive MBMS traffic alerts 155 do not have to periodically update NAS 115 with position information. Additionally, not having to provide NAS 115 with position information can alleviate privacy concerns of users. The position information of a vehicle (e.g., vehicle 135) may only be used when the vehicle (e.g., vehicle 135) provides a traffic notification 150 to the NAS 115. Vehicles (e.g., vehicles 140 and 145) that receive MBMS traffic alerts 155 do so by virtue of being in MBMS area 105 (and, in an embodiment, by subscribing to a service which provides the alerts), and thus do not have to update NAS 115 with their positions.

Additionally, some embodiments may have the UEs automatically provide traffic notifications without user intervention, or prompt the user to provide a notification, if the vehicle is stopped for some period of time, or traveling at a speed below a particular threshold. The threshold may be determined by knowing the vehicle's position and determining that it is on a road, and by further comparing the current vehicle speed to its speed history on the same road, and/or the speed limit for the road on which it is currently traveling. The speed limit may be may be determined (e.g., using look-up tables) knowing the particular road ascertained through vehicle's position and/or prior route.

In another embodiment, when the MBMS area 105 is relatively large, NAS 115 may use the regional broadcast capability to send a traffic alert 155 to a predetermined area within MBMS area 105 that is within a given number of miles from hazard 160. Vehicles within the predetermined area may receive the alert and thus inform the respective drivers, and vehicles outside the predetermined area may not receive the alert, thus avoiding inundating the driver with irrelevant traffic alerts.

In another embodiment, a UE in a vehicle may communicate multiple warnings to the driver, through a user interface, based on the proximity of the vehicle to the traffic event. The UE may compare the location of traffic event, as received through traffic alert 155, with the current position of the vehicle (which may be provided by a Global Positioning System (GPS) receiver). The UE may then adjust the warning based upon the distance to the traffic event and/or the duration in which the vehicle is travelling. For example, if vehicle 145 receives traffic alert 155 by virtue of being within MBMS area 105, but the distance between vehicle 145 and hazard 160 exceeds a large threshold, the UE in vehicle 145 may avoid providing a warning to the driver, and thus effectively ignore the received traffic alert 155. As vehicle 145 travels closer to hazard 160, a warning may be generated, whereby the urgency of the warning increases as the vehicle 145 nears hazard 160. For example, if vehicle 145 is within 15 miles of hazard 160, a message may be displayed on the UE so the driver is aware of hazard 160. As vehicle 145 gets closer to hazard 160, the UE may increase the urgency of the alert (by changing the display and/or generating a sound), and suggest alternate routes of travel to the driver. The driver may select one of the suggested routes, or ignore the warning and continue towards hazard 160.

Accordingly, by using MBMS features of LTE (e.g., eMBMS), a balance may be provided between information which is communicated from vehicles providing vehicle notifications and messages provided in the form of traffic alerts 155 to the appropriate vehicles in MBMS area 105. Additionally, UEs within the vehicles receiving traffic alerts can make local decisions on based on the location of the traffic event (e.g., hazard 160) and the current location of the vehicle and its route/direction of travel.

Further referring to FIG. 1, eNodeBs 110 may exchange traffic data with EPC 120 via mobile backhaul network 130. Mobile backhaul network 130 may further exchange traffic between eNodeBs in an LTE system without having to go through the EPC 120. EPC 120 may further exchange traffic data with NCSS 125 over a Wide Area Network (not shown). Additionally, NodeBs 110 may be functionally interconnected to each other in addition to being separately connected to mobile backhaul network 130, and may be referred to as the evolved UMTS Terrestrial Radio Access Network (eUTRAN). In other embodiments using different wireless standards, the eNodeBs 110 may be referred to as base stations and the eUTRAN referred to simply as a Radio Access Network (RAN). In addition to exchanging traffic with eNodeB 110 via mobile backhaul network 130, EPC 120 may perform control operations for eNodeBs 110 and UEs within vehicles 135-145 based at least in part on control plane signals (e.g., Non-Access Stratum functionality). EPC 120 may interface with other EPCs through a WAN (not shown) to exchange traffic data.

Further referring to FIG. 1, mobile backhaul network 130 may be any type network which supports one or more eNodeBs 110 for interfacing with EPC 120. Mobile backhaul network 130 may include Cell Site Routers (CSRs), Extended Backhaul (EBH) network(s), optical networks which include wavelength division multiplexed (WDM) optical components, multiservice provisioning platforms (MSPPs), metro-Ethernet networks, etc.

EPC 120 may be a core networking infrastructure that provides mobility management, session management, MBMS (e.g., eMBMS) functionality, authentication, and packet transport to support UEs and eNodeBs 110 for wireless communication, including MBMS traffic alerts 155. EPC 120 may be compatible with known wireless standards which may include, for example, LTE, LTE Advanced, Global System for Mobile Communications (GSM), Universal Mobile Telecommunications System (UMTS), IS-2000, etc.

ENodeB 110 may be any type of base station that can be included within any type of radio access network, and can be compatible with known wireless standards. Such standards may include, for example, LTE, LTE Advanced, GSM, UMTS, IS-2000, etc. In some embodiments, eNodeB 110 may be a wireless access point which can service any type of Wi-Fi standard (e.g., any IEEE 801.11x network, where x=a, b, c, g, and/or n), and/or include any other type of wireless network technology for covering larger areas, and may include a mesh network (e.g., IEEE 801.11s) and/or or a WiMAX IEEE 802.16.

Figure 3:
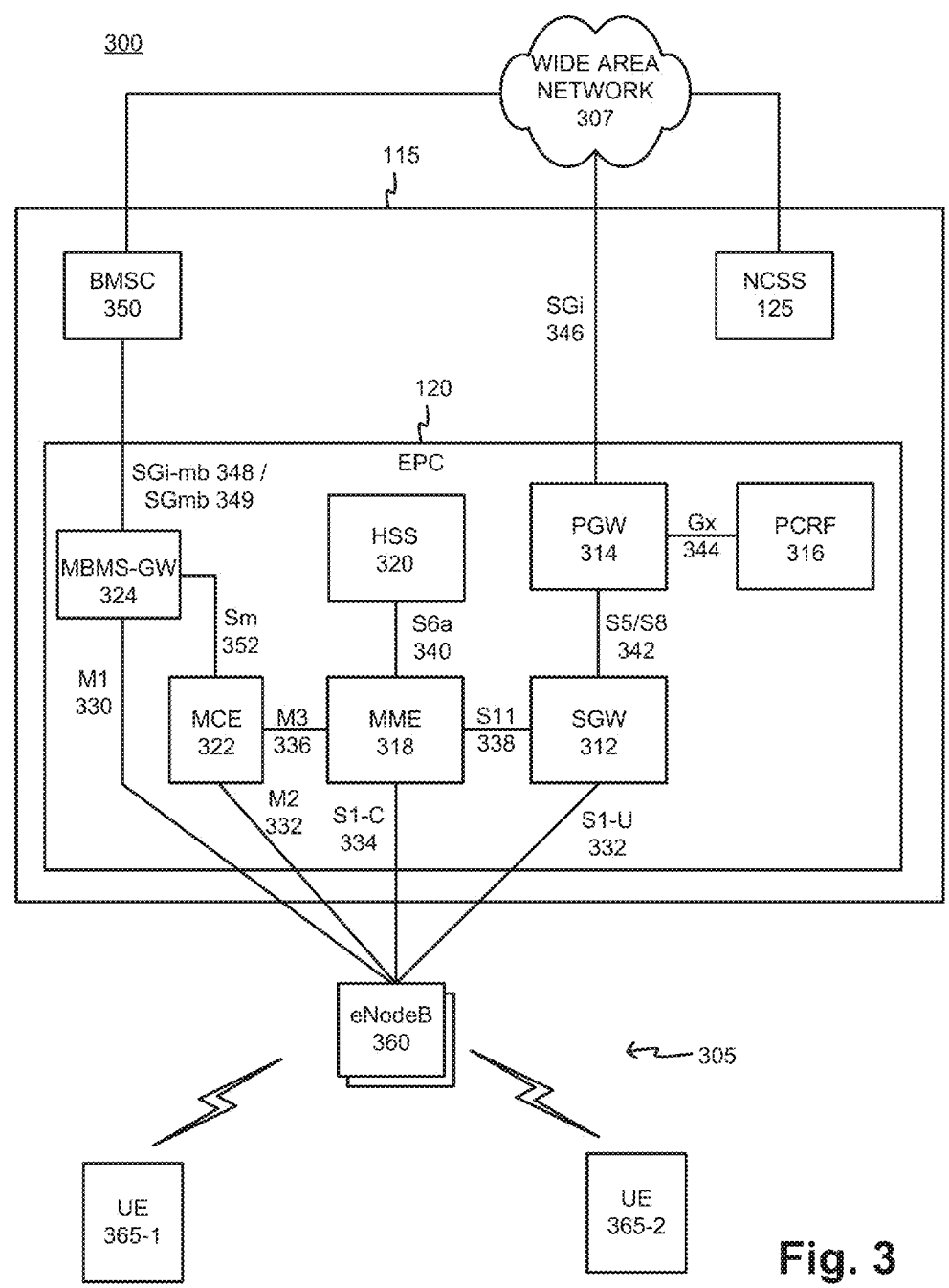
FIG. 3 is a block diagram showing exemplary components of a NAS within an exemplary environment.

NCSS 125 may be any type of networking device which may receive traffic notification(s) 150, analyze and consolidate multiple traffic notifications 150, and generate and provide messages to EPC 120 for the transmission of traffic alerts 155. NCSS 125 may further provide authentication, administration, and accounting functionality in relation to providing traffic alerts to subscribers as a service. Accordingly, NCSS 125 may be implemented as a general processor-based system executing software (e.g., a server or other network element), or embodied using dedicated hardware (e.g., ASICs, FPGAs, etc.), or as a combination thereof. NCSS 125 may interface to EPC 120 thorough a WAN (as shown in FIG. 3), or may alternatively connect to EPC 120 through a local interface. Details of an embodiment of NCSS 125 are discussed below in reference to FIGS. 3 and 5.

Figure 2:
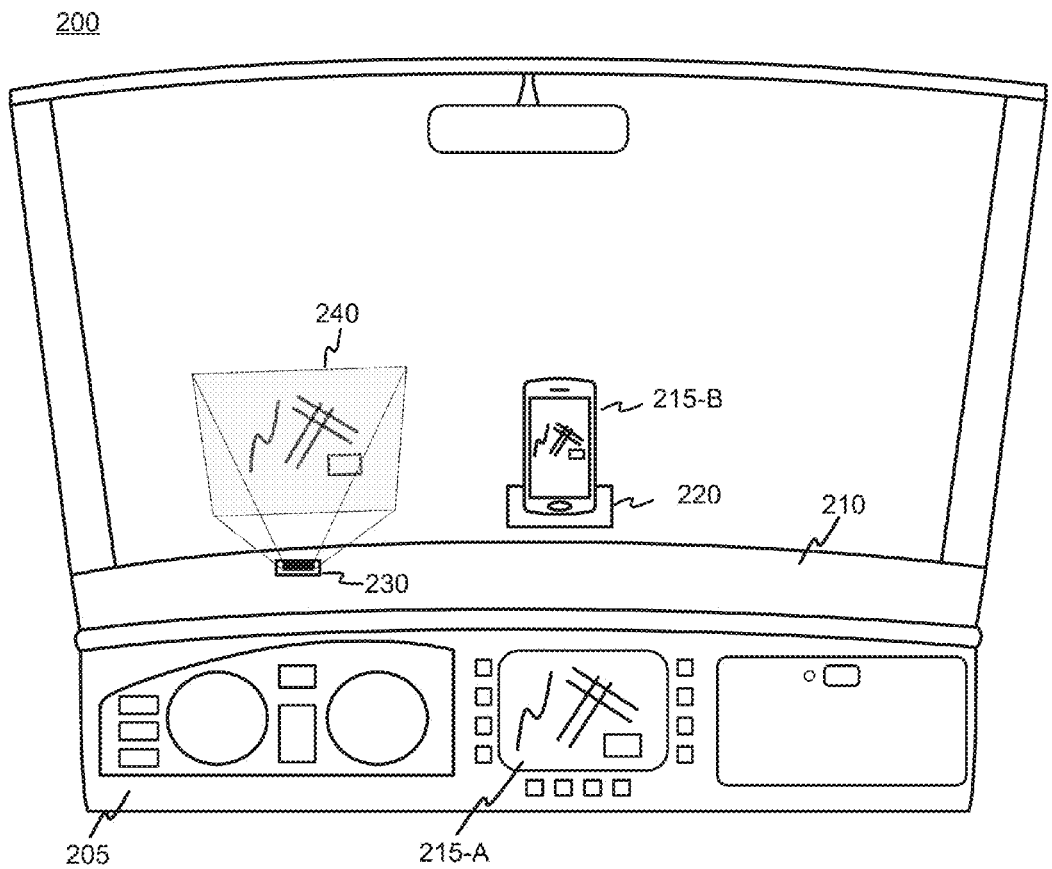
FIG. 2 is a diagram illustrating an interior of a vehicle showing different embodiments of a user device.

FIG. 2 is a diagram illustrating a vehicle interior 200 showing two exemplary embodiments of a user device. The perspective shown in FIG. 2 is from the viewpoint of a front-seat occupant looking towards the front of the vehicle, showing a dashboard 205 underneath dash pad 210. Vehicle interior 200 includes a UE 215 (referred to generically as "UE 215," plurally as "UEs 215," and specifically as "UE 215-A" or "UE 215-B," when referring to particular embodiments). In an embodiment, vehicle interior 200 may further include a "Heads-Up" Display (HUD) unit 230.

UE 215 may include a user interface which supports a map and/or user interface elements to permit a driver of the vehicle to command UE 215 to generate and wirelessly transmit a traffic notification to NAS 115. UE 215 may include position determination capabilities to include the position of the vehicle in the traffic notification. UE 215 may include additional user interface elements so that the driver may quickly and efficiently provide information describing the traffic event in the notification. For example, UE 215 may present in the form of a graphics display, classes of traffic hazards which may be quickly selected by the user using a touch interface. Alternatively or additionally, UE 215 may receive voice inputs from the driver, and use voice recognition algorithms to extract information to generate the traffic notification.

In one embodiment, UE 215-A may be realized as device built into dashboard 205, and serve as a navigation system and user interface that may wirelessly connect to NAS 115 using an on-board transceiver. The on-board transceiver associated with UE 215-A may be integral to the chassis associated with the display shown in FIG. 2, or may be included in a separate chassis which is functionally connected to the chassis. The user may enter inputs using a touch screen associated with UE 215-A, other user physical input devices (e.g., a joystick, a touch pad, dial(s), buttons, etc.), and/or voice recognition. UE 215-A may have the ability to download additional software in the form of applications (i.e., "apps"), which may be provided by NAS 115, in order to provide UE 215-A the ability to transmit traffic notifications to NAS 115.

In another embodiment, UE 215-B may a separate mobile device which can be placed within the vehicle, or be removably attached to an interior surface of the vehicle as shown in FIG. 2. For example, UE 215-B may be a smart phone removably coupled to a cradle 220 that can be mounted to the interior of the front windshield of the vehicle (as shown in FIG. 2), or to dash pad 210. Cradle 220 may only serve a mechanical function to secure UE 215-B, or may additionally provide electrical functionality to interface with one or more vehicle electronic systems (VESs) within the vehicle, accept vehicle power for charging UE 215-B, and/or provide an interface so that UE 215-B may exchange information with the vehicle's electronics system(s) (VESs). Cradle 220 may provide such an interface using physical connections to one or more VESs based on industry standard interfaces and protocols. Additionally, or alternatively, wireless channels between UE 215-B and the vehicle may be used for interfacing with one or more VESs. UE 215-B may support a variety of wireless interfaces with the vehicle which may include, for example, Bluetooth, Bluetooth Low Energy, Zigbee, Wi-Fi, etc. Additional wireless interfaces may be used, for example, to facilitate the interface of UE 215-B with the vehicle. For example, cradle 220 may use a Near Field Communication (NFC) wireless channel to exchange information with UE 215-B. NFC wireless channel may be used to exchange credentials for verification with NAS 115, trigger processes on UE 215-B, such as, for example, automatically start an application for providing the ability to send traffic notifications and receive traffic alerts to/from NAS 115. Cradle 220 may further provide electrical power to UE 215-B so it may be charged (either inductively or through a physical connection) while mounted within cradle 220.

UE 215-B may include any type of mobile electronic device having communication capabilities, and thus communicate over a network using one or more different channels, including both wired and wireless connections. UE 215-B may include, for example, a cellular (e.g., LTE compatible) mobile phone, a smart phone, a tablet, any type of IP communications device, a laptop computer, or a palmtop computer. In various embodiments, wireless channels over which UE communicates may be supported by any cellular radio access network (RAN), such as, for example, an LTE eUTRAN. In other embodiments, the wireless channels may be supported by a local or wide area wireless network. A local area wireless network may include any type of Wi-Fi (e.g., any IEEE 801.11x network, where x=a, b, c, g, and/or n). A wide area wireless network may include any type wireless network covering larger areas, and may include a mesh network (e.g., IEEE 801.11s) and/or or a WiMAX IEEE 802.16.

In another embodiment, the graphics display provided by UE 215 (either UE 215-A or UE 215-B) may be included in a projection 240 generated by HUD unit 230. HUD unit 230 may provide a display which includes a map and/or any other visual information generated by UE 215. Projection 240 may appear to the driver as a translucent image of such a size and character as to not distract the driver from seeing out of the windshield of vehicle interior 200.

FIG. 3 is a block diagram showing exemplary components of a NAS 115 within an exemplary environment 300. Environment 300 may include NAS 115, an evolved Universal Mobile Telecommunications System (UMTS) Terrestrial Radio Access Network (eUTRAN) 305, and wide area network (WAN) 307. eUTRAN 305 may further include one or more mobile devices, such as, for example, User Equipment (UEs) 365-1 and 365-2 (as used herein, plurally referred to as "UE 365" and individually as "UE 365-x"), and one or more base stations, such as, for example, eNodeBs 360. NAS 115 may further include Evolved Packet Core (EPC) 120, Navigation Crowd Sourcing System (NCSS) 125, and a Broadcast Multicast Service Center (BMSC) 350. While environment 300 is shown in the context of a Long Term Evolution (LTE) network, it should be appreciated that embodiments presented herein may operate in any appropriate wireless network(s). EUTRAN 305 and EPC 120 may further include one or more devices that are physical and/or logical entities interconnected via standardized interfaces. EUTRAN 305 and EPC 120 may provide wireless packet-switched services and wireless Internet Protocol (IP) connectivity to mobile devices to provide, for example, data, voice, and/or multimedia services such as, for example, eMBMS. It is noted that FIG. 3 depicts a representative environment 300 with exemplary components and configuration shown for purposes of explanation. Other embodiments may include additional or different network entities in alternative configurations than which are exemplified in FIG. 3. Furthermore, in the description provided below, UEs 365 may correspond UEs 215 and/or eNodeBs 360 may correspond to eNodeBs 110.

NCSS 125 may interconnect with EPC 120 and/or BMSC 350 through WAN 307 and communicate with EPC 120 to exchange traffic notifications and traffic alerts. NCSS 125 and BMSC 350 may interface to WAN 307 using an Ethernet connection over TCP/IP, where the physical interfaces may be any interface having sufficient resources to support the exchange of traffic alerts and traffic notifications. Such interface may include, for example, 10 BASE-T, 1000 BASE-TX, and/or 1000 BASE-T over twisted pair, coaxial cable, and/or optical fiber. Alternatively, NCSS 125 may connect with BMSC over a local area network using Ethernet and TCP/IP based networking standards. In an embodiment, BMSC 350 may in part, serve as an intermediary for exchanging messages between EPC 120 and NCSS 125. For example, BMSC 350 may provide traffic alerts received from UEs 365 (via eUTRAN 305 and EPC 120) to NCSS 125. In response to receiving the traffic alerts, NCSS 125 may send the traffic notifications to BMSC 350, which may be forwarded to UEs 365 through EPC 120 and eUTRAN 305.

Further referring to FIG. 3, EPC 120 may further include a serving gateway (SGW) device 312, a packet data network (PDN) gateway (PGW) 314, a Policy and Charging Rules Function (PCRF) 316, a mobility management entity (MME) 318, a home subscriber server (HSS) 320, a Multicast Coordination Entity (MCE) 322, and a Multimedia Broadcast Multicast System Gateway (MBMS-GW) 324. It is noted that FIG. 3 depicts a representative EPC 120 with exemplary components and configuration shown for purposes of explanation. Other embodiments may include additional or different network entities in alternative configurations than which are exemplified in FIG. 3.

Further referring to FIG. 3, eNodeBs 360 may include one or more devices and other components having functionality that allow UEs 365 to wirelessly connect to eUTRAN 305. ENodeBs 360 may interface with EPC 120 via a S1 interface, which may be split into a control plane S1-C interface 334 and a data plane S1-U interface 332. S1-C interface 334 may interface with MME 318. S1-C interface 334 may be implemented, for example, with a protocol stack that includes a Network Access Server (NAS) protocol and/or Stream Control Transmission Protocol (SCTP). S1-U interface 332 may interface with SGW 312 and may be implemented, for example, using a General Packet Radio Service Tunneling Protocol User Plane (GTP-U). ENodeBs 360 may communicate among themselves via an X2 interface (not shown). The X2 interface may be implemented, for example, with a protocol stack that includes an X2 application protocol and SCTP.

For MBMS (e.g., eMBMS) functionality, eNodeBs 360 may connect to MCE 322 over an M2 interface 332. The embodiment shown in FIG. 3 illustrates a "centralized MCE architecture" where MCE 322 may be a logical entity that can be deployed as a stand-alone physical entity, or collocated in another physical entity in EPC 120. In another embodiment (not shown), the EPC 120 may be realized using a "distributed MCE architecture" where a single MCE 322 is included in each eNodeB 360. MCE 322 may provide MBMS session control signaling over M2 interface 332 using SCTP, where MBMS session control signaling may include radio configuration data for multi-cell transmission modes. EnodeBs 360 may further communicate with MBMS-GW 324 over an M1 interface 330, and send (i.e., broadcast/multicast) MBMS packets to each eNodeB 360 which is transmitting data associated with the service. M1 330 interface may be a user plane interface for providing MBMS traffic that can be implemented using the MBMS synchronization protocol (SYNC) and GTP-U. The SYNC protocol helps eNodeBs 365 identify the timing for MBMS radio frame transmission and detect packet loss.

SGW 312 may provide an access point to and from UEs 365, may handle forwarding of data packets for UEs 365, and may act as a local anchor point during handover procedures between eNodeBs 360. SGW 312 may interface with PGW 314 through an S5/S8 interface 342. S5/S8 interface 342 may be implemented, for example, using GTP-U.

PGW 314 may function as a gateway to WAN 307 through a SGi interface 346. WAN 307 may include, for example, an IP Multimedia Subsystem (IMS) network, which may provide voice and multimedia services to UE 365, based on Session Initiation Protocol (SIP). A particular UE 365, while connected to a single SGW 312, may be connected to multiple PGWs 314, one for each packet network with which UE 365 communicates.

PCRF 316 provides policy control decision and flow based charging control functionalities. PCRF 316 may provide network control regarding service data flow detection, gating, Quality of Service (QoS) and flow based charging, etc. PCRF 316 may determine how a certain service data flow shall be treated, and may ensure that user plane traffic mapping and treatment is in accordance with a user's subscription profile. PCRF 316 may communicate with PGW 314 using a Gx interface 344. Gx interface 344 may be implemented, for example, using a Diameter protocol.

MME 318 may implement control plane processing for EPC 120 and eUTRAN 305. For example, MME 318 may implement tracking and paging procedures for UEs 365, may activate and deactivate bearers for UEs 365, may authenticate users of UEs 365, and may interface to non-LTE radio access networks. MME 318 may also select a particular SGW 312 for a particular UE 365-x. MME 318 may interface with other MMEs (not shown) in EPC 120 and may send and receive information associated with UEs 365, which may allow MME 318 device to take over control plane processing of UEs 365 serviced by another MME device, if the other MME device becomes unavailable. MME device 318 may communicate with SGW 312 through an S11 interface 338. S11 interface 338 may be implemented, for example, using General Packet Radio Service Tunneling Protocol Control plane (GTPv2-C). S11 interface 338 may be used to create and manage a new session for a particular UE 365-x. S11 interface 338 may be activated when MME 318 needs to communicate with SGW 312, such as when the particular UE 365 attaches to EPC 120, when bearers need to be added or modified for an existing session for the particular UE 365, when a connection to a new PGW 314 needs to created, or during a handover procedure (e.g., when the particular UE 365-x needs to switch to a different SGW 312).

HSS device 320 may store information associated with UEs 365 and/or information associated with users of UEs 365. For example, HSS device 320 may store user profiles that include authentication and access authorization information. MME device 318 may communicate with HSS device 320 through an S6a interface 340. S6a interface 340 may be implemented, for example, using a Diameter protocol.

MCE 322 can be a separate entity as shown in FIG. 3 or be included as part of each eNodeB 360. MCE 322 may provide admission control through MBMS session control signaling and allocate wireless channel resources for UEs 365 in an MBMS area associated with eUTRAN 305. Specifically, MCE 322 may: 1) allocate time and frequency radio resources for eMBMS transmissions; and 2) determine radio configuration, such as, for example, the Modulation and Coding Scheme (MCS) for MBMS transmissions by eNodeBs 360. MCE 322 may also be connected with MME 318 over an M3 interface 336 to provide MBMS session control signaling (e.g., "MBMS Session Start" and "MBMS Session Stop" commands) on an eUTRAN Radio Access Bearer (E-RAB) level (i.e., no radio configuration data is conveyed). Exchanges over the M3 interface 336 may performed using SCTP.

MBMS-GW 324 (e.g., an eMBMS Gateway) distributes (i.e., multicasts and/or broadcasts) MBMS user plane data packets to eNodeBs 360 that participate in a multicast service in an MBMS area 105. The data packets may be distributed to participating eNodeBs 360 using Internet Protocol (IP) Multicast. MBMS-GW 324 may receive the MBMS data packets (e.g., multicast traffic alerts 155) from BMSC 350 over an SGi-mb interface 348. MBMS-GW may also exchange MBMS session control signaling (e.g., session start/update/stop messages) with BMSC 350 over an SG-mb interface 349. The MBMS session control signaling received from BMSC 350 may be forwarded to MCE 322 over an Sm interface 352, which are in turn forwarded towards the eUTRAN 305 through MME 318. Sm interface 352 may be implemented using a GTPv2-C message protocol which may be carried over User Datagram Protocol (UDP) to start, stop, and modify MBMS sessions. MBMS-GW 324 may be a logical entity that exists as a separate device or may be collocated in another device within EPC 120.

BMSC 350 may act as gateway between content providers (e.g., NCSS 125) and MBMS-GW 324 in EPC 120. BMSC 350 may receive data (e.g., traffic alerts) from content providers over wide area network 307 via, for example, an Ethernet connection implementing TCP/IP. BMSC 350 may process the received data to facilitate its distribution as MBMS packets by EPC 120, and perform bearer processing which may include adding forward error correction and preparing the received data for unidirectional delivery of files using the File Delivery over Unidirectional Transport (FLUTE) protocol. BMSC 350 may also control and schedule the MBMS sessions by providing session control messages to MBMS-GW over SGmb interface 349. The session control messages may include service announcements, session start and stop messages, etc. The BMSC may also provide admission control for the MBMS services by providing session membership, user authorization and authentication, and security.

NCSS 125 may be hosted on any type of web server, media repository, streaming source, etc., that can provide the data so that BMSC 350 and EPC 120 may generate and transmit the multicast traffic alerts. NCSS 125 may generate the traffic alerts based on traffic notification received from BMSC 350. The traffic alerts may include any form of media, text, audio, image, video, etc., which can be forwarded to NCSS 125 in traffic notifications sent by UEs 365.

Wide Area Network 307 may include any type wired or wireless network covering larger areas. For example, WAN 307 may include a metropolitan area network (MAN), a Public Switched Telephone Network (PSTN), an ad hoc network, an intranet, the Internet, a fiber optic-based network, a wireless network, and/or a combination of these or other types of networks. WAN 307 may be an IP based network or utilize MultiProtocol Label Switching (MPLS), and may include a mesh network (e.g., IEEE 801.11s) and/or or a WiMAX IEEE 802.16. WAN 307 may include one or more circuit-switched networks and/or packet-switched networks.

FIG. 3 depicts a representative environment 300 with exemplary components and configuration and is shown for purposes of explanation. Other implementations may include fewer components, different components, differently arranged components, or additional components than exemplified in FIG. 3. Additionally or alternatively, one or more components of network 100 may perform functions described as being performed by one or more other components.

Figure 4:
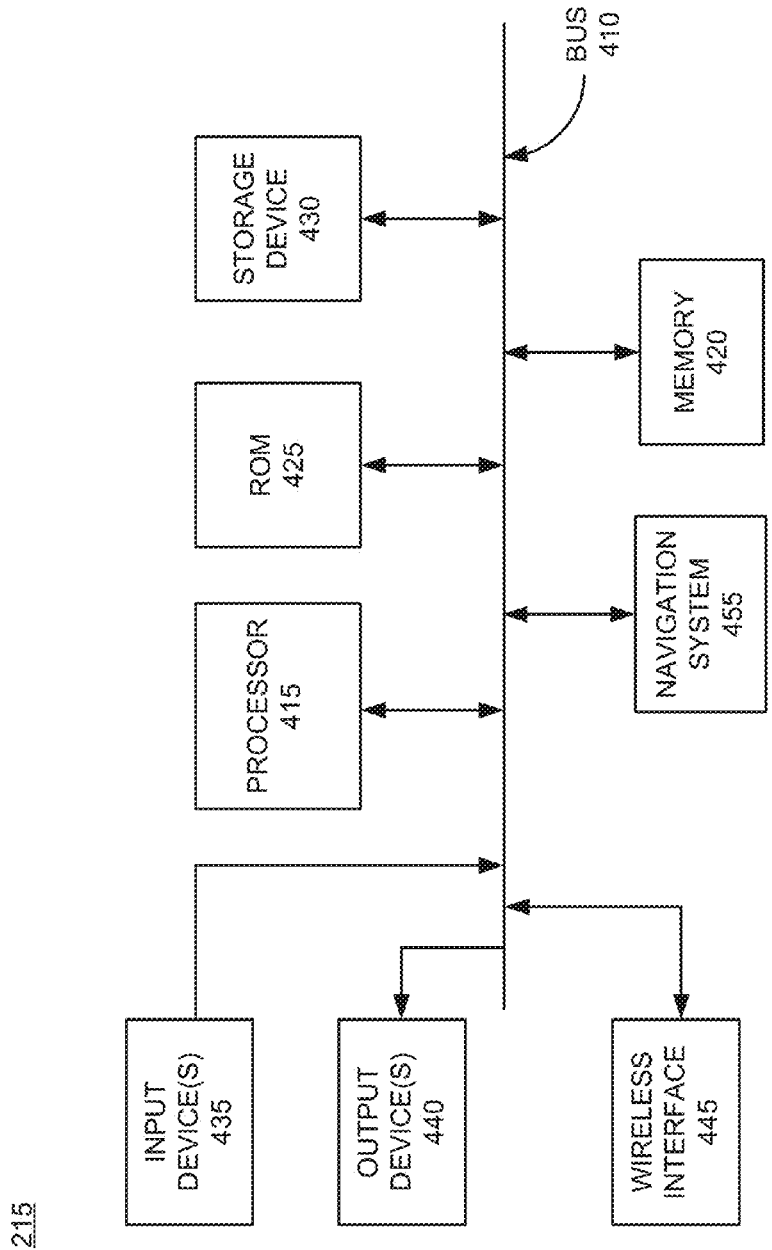
FIG. 4 is a block diagram showing exemplary components of a User Equipment (UE) device according to an embodiment.

FIG. 4 is a block diagram showing exemplary components of a User Equipment (UE) 215 device according to an embodiment. UE 215 may include any mobile communication device configured to communicate with eNodeB 110 (or eNodeB 360) via wireless signals. For example, UE 215 may include a portable communication device (e.g., a mobile phone, a smart phone, a phablet device, a global positioning system (GPS) device, and/or another type of wireless device); an in-vehicle navigation system which may include a head unit for user interaction and control, a telephone terminal; a personal computer or workstation; a server device; a laptop, tablet, or another type of portable computer; a media playing device; a wearable computer; a portable gaming system; and/or any type of mobile device with wireless communication capability.

UE 215 may include a bus 410, a processor 415, memory 420, a read only memory (ROM) 425, a storage device 430, one or more input device(s) 435, one or more output device(s) 440, a wireless interface 445, and a navigation system 455. Bus 410 may include a path that permits communication among the elements of UE 215.

Processor 415 may include a processor, microprocessor, or processing logic that may interpret and execute instructions. Memory 420 may include a random access memory (RAM) or another type of dynamic storage device that may store information and instructions for execution by processor 415. ROM 425 may include a ROM device or another type of static storage device that may store static information and instructions for use by processor 415. Storage device 430 may include a magnetic and/or optical recording medium and its corresponding drive.

Input device(s) 435 may include one or more mechanisms that permit an operator to input information to UE 415, such as, for example, a keypad or a keyboard, a microphone, voice recognition, a touchscreen, and/or biometric mechanisms, etc. Output device(s) 440 may include one or more mechanisms that output information to the operator, including a display, a speaker, etc. Wireless interface 445 may include any transceiver mechanism that enables UE 215 to communicate with other devices and/or systems. For example, wireless interface 445 may include mechanisms for communicating with another device or system via a network, such as wireless network eUTRAN 305.

Navigation system 455 may be any system that provides position data in an absolute reference (e.g., a satellite navigation system (SNS) receiver providing position data in the WGS-84 system) and/or relative reference(s) (e.g., accelerometers). When deriving positions, navigation system 455 may utilize a receiver specifically designed for use with the SNS that extracts position, using conventional techniques, from a plurality of signals transmitted by SNS satellites. Various SNS may be used, which typically include a system of transmitters positioned to enable UEs 215 to determine its location based on signals received from the transmitters. In a particular example, such transmitters may be located on Earth orbiting satellites. For example, a satellite in a constellation of Global Navigation System (GNS) such as Global Positioning System (GPS), Galileo, or Glonass may transmit a signal marked with a Pseudorandom Noise (PN) code that may be distinguishable from PN codes transmitted by other satellites in the constellation.

UE 215 may perform certain operations or processes, as may be described in detail below. UE 215 may perform these operations in response to processor 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into memory 420 from another computer-readable medium, such as storage device 430, or from another device via wireless interface 445. The software instructions contained in memory 420 may cause processor 415 to perform operations or processes that will be described in detail with respect to FIG. 7. Alternatively, hardwired circuitry may be used in place of or in combination with software instructions to implement processes consistent with the principles of the embodiments. Thus, exemplary implementations are not limited to any specific combination of hardware circuitry and software. The configuration of components of UE 215 illustrated in FIG. 4 is for illustrative purposes only. It should be understood that other configurations may be implemented. Therefore, UE 215 may include additional, fewer and/or different components than those depicted in FIG. 4.

Figure 5:
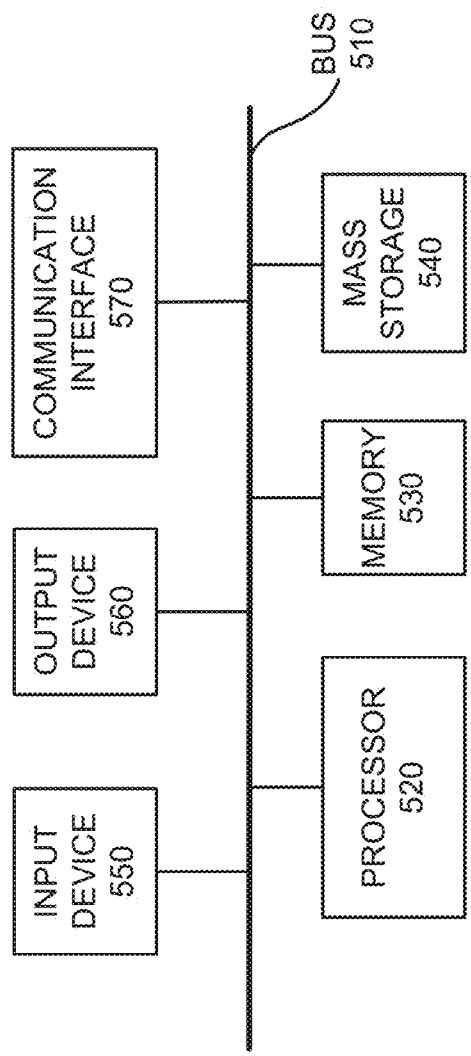
FIG. 5 is a block diagram illustrating exemplary components of a network element within the exemplary environment of FIG. 1.

FIG. 5 is a block diagram showing exemplary components of a network element 500 which may reside in NAS 115 and/or eUTRAN 305. Network element 500 may represent, for example, eNodeB 110, NCSS 125, SGW 312, PGW 314, PCRF 316, MME 318, HSS 320, MCE 322, MBMS-GW 324 and/or BMSC 350. Network element 500 may include a bus 510, a processor 520, a memory 530, mass storage 540, an input device 550, an output device 560, and a communication interface 570.

Bus 510 includes a path that permits communication among the components of network element 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, processor 520 may be an x86 based CPU, and may use any operating system, which may include varieties of the Windows, UNIX, and/or Linux. Processor 520 may also use high-level analysis software packages and/or custom software written in any programming and/or scripting languages for interacting with other network entities.

Memory 530 may include any type of dynamic storage device that may store information and/or instructions, for execution by processor 520, and/or any type of non-volatile storage device that may store information for use by processor 520. For example, memory 530 may include a RAM or another type of dynamic storage device, a ROM device or another type of static storage device, and/or a removable form of memory, such as a flash memory. Mass storage device 540 may include any type of on-board device suitable for storing large amounts of data, and may include one or more hard drives, solid state drives, and/or various types of Redundant Array of Independent Disk (RAID) arrays.

Input device 550, which may be optional, can allow an operator to input information into network element 500, if required. Input device 550 may include, for example, a keyboard, a mouse, a pen, a microphone, a remote control, an audio capture device, an image and/or video capture device, a touch-screen display, and/or another type of input device. In some embodiments, network element 500 may be managed remotely and may not include input device 550. Output device 560 may output information to an operator of network element 400. Output device 460 may include a display (such as a Liquid Crystal Display (LCD)), a printer, a speaker, and/or another type of output device. In some embodiments, network element 500 may be managed remotely and may not include output device 560.

Communication interface 570 may include a logical component that includes input and/or output ports, input and/or output systems, and/or other input and output components that facilitate the transmission of data to other devices. For example, communication interface 570 may include a network interface card (e.g., Ethernet card) for wired communications and/or a wireless network interface (e.g., a Wi-Fi) card for wireless communications. Communication interface 570 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 570 may further include one or more Radio Frequency (RF) transceivers that enable communications with UEs 110 via wireless channels in eUTRAN 305. An RF transceiver may include an RF transmitter that receives signals to be transmitted wirelessly and performs signal processing on the signals before providing the signals to an antenna assembly (not shown), and an RF receiver (not shown) that receives signals from the antenna assembly and performs signal processing on the received signals before providing the received signals to processor 520. For example, the RF transceiver may perform analog-to-digital and digital-to-analog conversion, modulation and demodulation, up-conversion and down-conversion, and/or amplification of signals.

As described below, network element 500 may perform certain operations relating to EPC 120, NCSS 125, and/or eNodeBs 110 (or other devices/systems in environment 300). Network element 500 may perform these operations in response to processor 520 executing software instructions contained in a computer-readable medium, such as memory 530 and/or mass storage 540. The software instructions may be read into memory 530 from another computer-readable medium or from another device. The software instructions contained in memory 530 may cause processor 520 to perform processes described herein, such as, for example, process 800 depicted in FIG. 8. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of network element 500, in other implementations, network element 500 may include fewer components, different components, additional components, or differently arranged components than depicted in FIG. 5.

Figure 6:
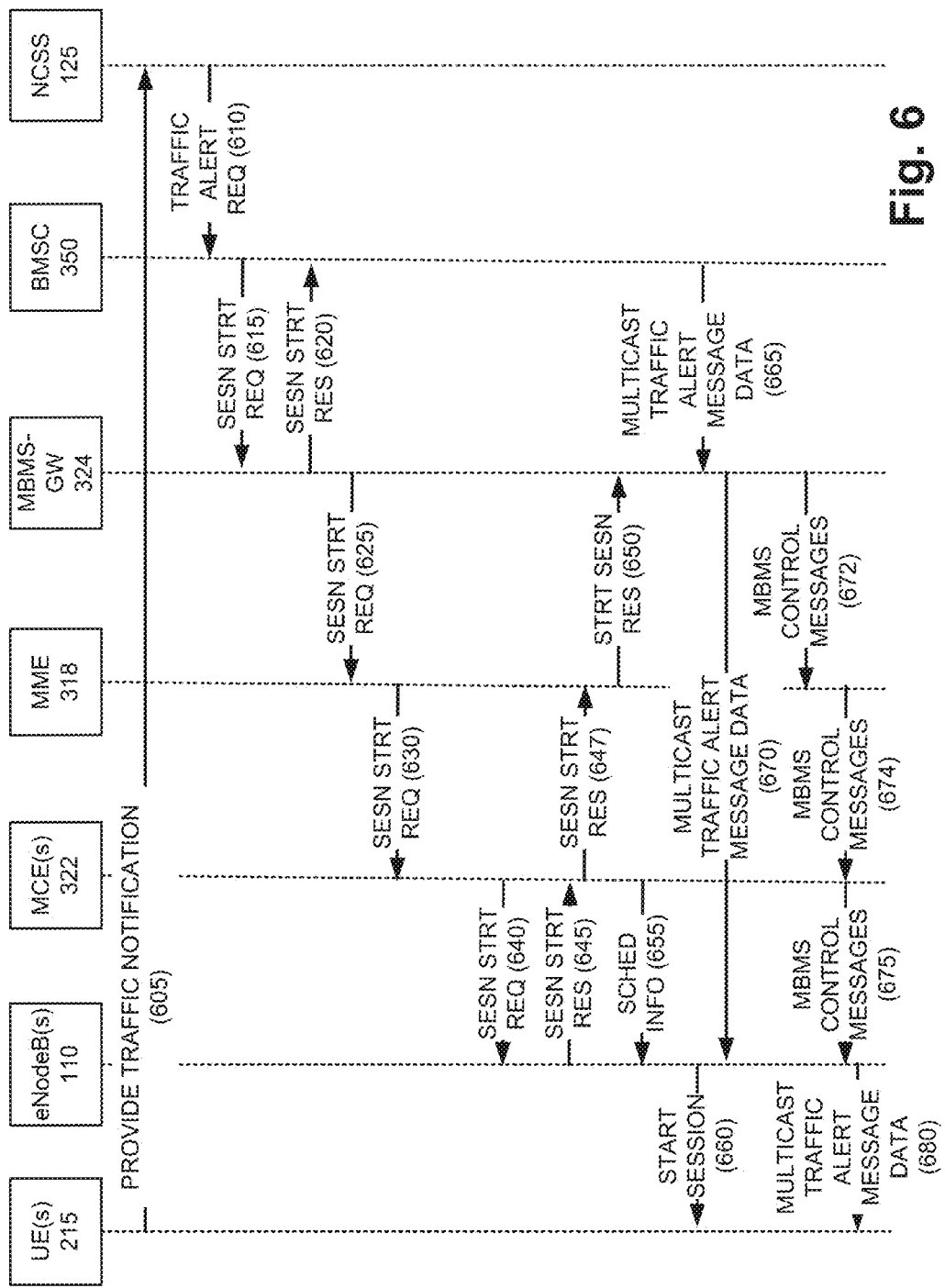
FIG. 6 is a signal flow diagram depicting exemplary messages exchanged between networking elements.

FIG. 6 is a signal flow diagram depicting exemplary messages exchanged between networking elements within NAS 115 and eUTRAN 305. In an embodiment, UE 215 (or UE 365) may initially send traffic notification 150 to NCSS 125 (605). Traffic notification 150 may be generated by UE 215 at the direction of the user, and subsequently sent in a unicast message to the NCSS 125 through eNodeB 110-1 and over EPC 120. Being a unicast message, EPC 120 may receive traffic notification 150 at SGW 312, which may be forwarded on to PGW 314. PGW 314 may send traffic notification 150 outside the EPC 120 over WAN 307 to NCSS 125.

NCSS 125 may receive traffic notifications from multiple UEs 215 over different geographic areas, and may analyze and consolidate the traffic notifications. The traffic notifications may be consolidated based on location (e.g., the GPS position and/or velocity of UE 215 provided in each traffic notification 150) and/or event description of hazard 160, including a situational description (e.g., police, road blocked/object in road, road conditions, weather, etc.) provided via text data and/or a numerical code), and/or other contextual information, including multimedia data associated with the hazard 160. The traffic notifications may provide identifying information of the owner (presumably the user) of UE 215 in the form of authentication credentials and/or identifying codes associated with UE 215, such as, for example, an International Mobile Equipment Identity (IMEI) number. The identifying information may be used to provide admission to access navigation services provided by NCSS 125.

NCSS 125 may generate a traffic alert request based on one or more consolidated traffic notifications, and send the traffic alert request to BMSC 350 (610). The traffic alert request may include an approximate position of road hazard 160 derived from one or more traffic notifications received from UEs 215. NCSS 125 may also determine a size of an "affected area" impacted by traffic hazard 160. The determination of the affected area may be based on parameters which may include, for example, the number and position of notifications, the velocities of the UEs 215 providing notifications, and/or the event descriptions (which may be provided as standard codes). NCSS 125 may include the estimated position of hazard 160 and the affected area in the traffic alert request. The traffic request alert may then be provided to BMSC 350 over wide area network 307. The traffic alert request may further include, in addition to the estimated position information of hazard 160 and the affected area, the event description and/or contextual information provided in the traffic notification received from one or more UEs 215.

If multiple instances of event descriptions and/or contextual information are provided in a plurality traffic notifications received from different UEs 215, then NCSS 125 may consolidate such additional information based on quality, proximity, statistical analyses, etc. In an embodiment, a plurality of alerts may be created in response to one or more traffic notifications regarding the same traffic hazard 160, where the different traffic alerts may be targeted at vehicles in different locations within the MBMS area 105 depending upon the vehicles' proximity to hazard 160. Accordingly, for example, different traffic alerts may be provided by NAS 115 as a vehicle approaches the hazard. Alternatively, one alert may be provided based on the location of hazard 160, and the UE 215 in the vehicle may provide different warnings to the driver based on the same alert. For example, the warnings to the driver may increase in urgency as the driver approaches hazard 160.

Upon receiving the traffic alert request (610) from NCSS 125, BMSC 350 may initially determine the appropriate MBMS area 105 based on the position of hazard 160 and the affected area provided in the traffic alert request. BMSC 350 may determine the appropriate eNodeBs 110 to join the session and establish the MBMS area 105 for broadcasting or multicasting the traffic alert data, and thus target the vehicles in the MBMS area 105. In an embodiment, users may subscribe to the services provided by NAS 115, so only vehicles being driven by users having a subscription may receive the multicast traffic alerts. BMSC 350 may further provide a Session Start Request to MBMS-GW 324 (615) along with the appropriate information for the MBMS area 105, which may include identifying the eNodeBs 110 which will be participating in transmitting the multicast traffic alerts 155. The Session Start Request (615) may indicate the impending start of the MBMS session and provide the session attributes to the MBMS-GW 324. The session attributes may include a Temporary Mobile Group Identifier (TMGI), a Flow Identifier, QoS parameters, MBMS service area information, session identifier, estimated session duration, list of MBMS control plane nodes (MMEs 318) for MBMS-GW 324, time to MBMS data transfer, MBMS data transfer start, and/or access indicator. The Session Start Request (615) is sent to the MBMS-GWs listed in the "downstream nodes" parameter of the corresponding MBMS bearer context in the BMSC 350. The BMSC 350 may start multiple sessions for the same MBMS bearer service (identified by the TMGI), but with different content.

MBMS-GW 324, upon receiving the Session Start Request (615), may acknowledge the Start Session Request (615) by responding with a Session Start Response (620) to BMSC 350. MBMS-GW 324 may create an MBMS bearer context and store the session attributes and the list of MBMS control plane nodes in the MBMS bearer context and allocate a transport network IP multicast address for the session. The Session Start Response provides an indication to the BMSC 350 that MBMS-GW 324 is ready to receive MBMS data (e.g., multicast traffic alerts). MBMS-GW 324 may then forward the Session Start Request (625) to MME (s) 318 (625) involved in eMBMS session, which may be listed in a "list of MBMS control plane nodes" parameter included in the Session Start Request (615).

After receiving the Session Start Request from MBMS-GW 324 (625), MME(s) 318 may create an MBMS bearer context, and forward a Session Start Request to MCE(s) 322 (630) which control the eNodeBs 110 in the targeted MBMS area 105. The Session Start Request may include the IP multicast address, session attributes, and the minimum time to wait before the first data delivery. The MCE(s) 322 may coordinate radio resource allocation among the eNodeB(s) 110 within the targeted MBMS area (e.g., MBMS area 105). As described above, MME 318 may send Session Start Request to MCE(s) 322 (630) which are controlling eNobeB (s) in MBMS area 105. The Session Start Request may include the IP multicast address(es), session attributes and/or the minimum time to wait before the first data allocate radio resources per MCE(s) 322 instructions. MCE(s) 322 may determine whether the radio resources are sufficient for establishing a new MBMS service(s) within the targeted MBMS area 105. If the radio resources are insufficient, MCE 322 may decide not to establish the radio bearers of the MBMS service(s), and may not forward a Session Start Request to their corresponding eNodeB(s) 110, or alternatively MCE(s) 322 may pre-empt radio resources from other radio bearer(s) of ongoing MBMS service(s).

If there are sufficient radio resources to support a new MBMS session, MCE(s) 322 may send a Session Start Request to their respective eNodeB(s) 110 in the MBMS area 105 (640). The Session Start Request (640) instructs the eNodeB(s) 110 to prepare for receiving MBMS message data over M1 GTP-U tunnels. ENodeBs(s) within the MBMS areas 105 may be targeted based on the MBMS Service Area Identity (SAI) parameter which may be included in the MBMS Session Start Request (630) received from MME 318. Based on the SAI, MCE(s) 322 may determine which MBMS area(s) will deliver the service/data. If the SAI has a value 0, MCE(s) 322 shall consider that all the eNodeBs 110 under their control will participate in the MBMS session. MCE(s) 322 may receive a Session Start Response from eNodeBs 110 (645). The Session Start Response (645) confirms the reception of the MBMS Session Start message.

In response, to Session Start Response (645), MCE(s) 322 may confirm the reception of the Session Start Response message (645) from eNodeBs 110 by sending a Session Start Response (647) back to MME 318. MME 318 may then send a Session Start Response (650) back to MBMS-GW 324. MBMS-GW 324 may respond by creating an MBMS bearer context for providing MBMS messages (e.g., multicast traffic alerts) and store the session attributes and list of MBMS control plane nodes in the MBMS bearer context. For example, MBMS-GW 324 may create and/or maintain an M1 GTP-U tunnel to eNodeBs 110 to distribute content to eNodeBs participating in an eMBMS session. The MBMS-GW 324 may use IP source specific multicast (SSM) and the IP Multicast address for distribution. The IP Multicast Address may be unique for the MBMS bearer service, or it may be reused from another active MBMS bearer service with an identical service area and of the same QoS. The proposed IP Multicast address for distribution may be indicated by the MBMS-GW 324 to the downstream MMEs 318 in the Session Start Request (625).

Once it has determined there are sufficient radio resources for the MBMS session, MCE(s) 322 may provide a Scheduling Information message to the eNodeBs 110 (665). The Scheduling Information message (655) may include update Multicast Control Channel (MCCH) information which may carry the MBMS service's configuration information. ENodeB(s) 110 may transmit an MBMS Start Session message to UE(s) 215 (660). In an embodiment, the BMSC 350 may start sending the MBMS data (e.g. multicast traffic alert message data) to MBMS-GW 324 (665). Alternatively, the MBMS data may have been received earlier by MBMS-GW 324 and stored for later transmission. The MBMS-GW 324 may send the MBMS data (e.g. multicast traffic alert message data) to eNodeB(s) 110 (670) over the M1 GTP-U tunnel, and may relay MBMS control messages to MME 318 (672) for the session. The MME may relay the MBMS control messages to MCE(s) 322 (674), which may be forwarded by MCE(s) 322 onto eNodeB(s) 110 (675). ENodeB(s) 110 may transmit over a wireless channel(s) the MBMS data (e.g., multicast traffic alert message data) to the appropriate UEs 215 (680) at the specified start time. In an embodiment, the multicast traffic alert message data (680) may only be decoded by UEs 215 having a subscription to a service associated with the NAS 115 which may be administered by the NCSS 125. Alternatively, in some emergency situations, the multicast traffic alert message may be transmitted to and decoded by all UEs 215 in MBMS area 105.

Figure 7:
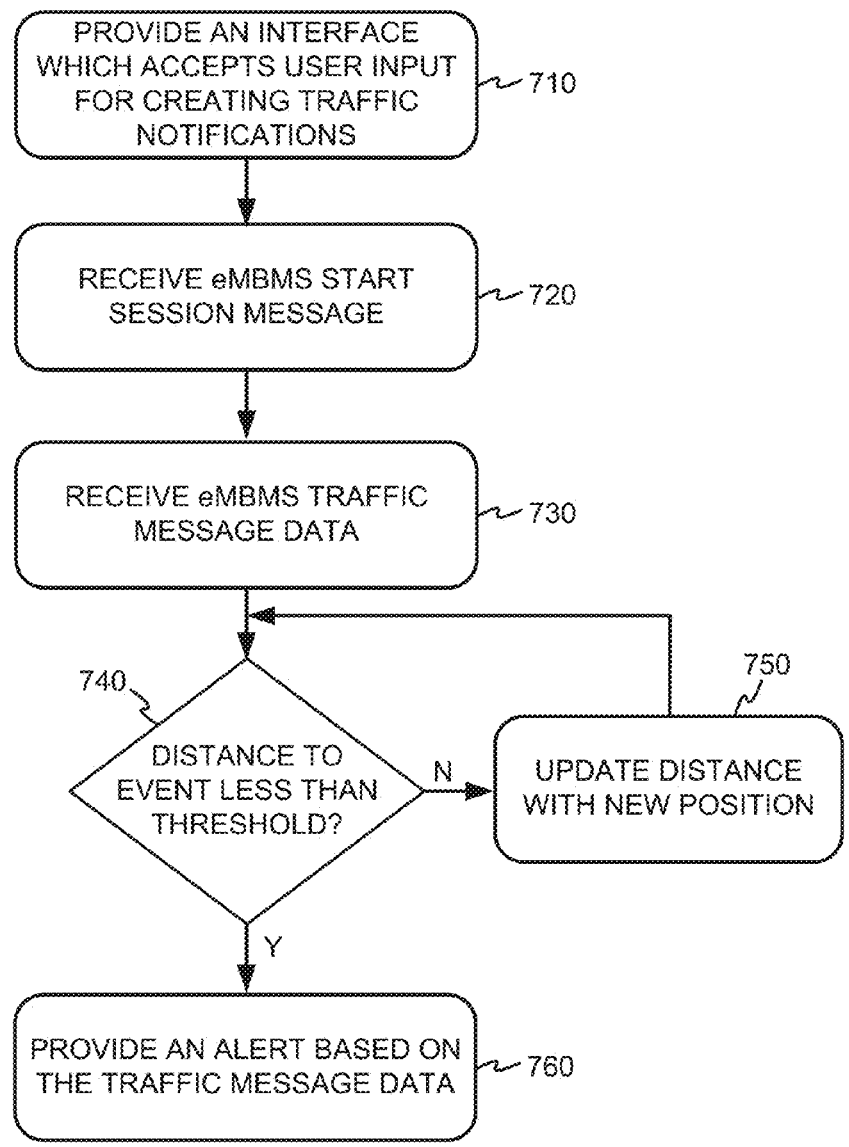
FIG. 7 is a flow chart showing an exemplary process for providing a QoS policy based on bandwidth.

FIG. 7 is a flow chart showing an exemplary process 700 for receiving multicast traffic alerts provided by NAS 115. Process 700 may be performed by UE 215, for example, by executing instructions on processor 415. UE 215 may provide an interface which accepts user input for creating traffic notifications (Block 710). The interface may be provided on output device(s) 440, such as, for example, on a touch screen display. In an embodiment, UE 215 may receive a command by the driver to send a traffic notification. In response, UE 215 may generate a traffic notification (e.g., 150), and wirelessly send the traffic notification to the NAS 115 via an eNodeB (e.g., eNodeB 110-1). In another embodiment, UE 215 may send a traffic notification automatically based on various conditions which may be determined by UE 215. For example, if one or more vehicles within MBMS area 105 experiences a reduction in speed for a predetermined period of time, a traffic notification may automatically be sent by UE 215 to NAS 115. In an embodiment, UE 215 may request permission of the driver prior to sending the traffic notification. Generating the traffic notification may further include having navigation system 455 estimate the current position of UE 215, and include the current position in the traffic notification. Navigation system 455 may ascertain the current position from a satellite position determination system (e.g., GPS), dead reckoning based on accelerometers in UE 215 (which may be present in navigation system 455), and/or from positioning techniques (e.g., trilateration) using eUTRAN 305 and/or EPC 120.

Generating the traffic notification may further include having UE 215 collect metadata and/or multimedia data using an on-board sensor (e.g., camera, microphone, etc.) for inclusion in the traffic notification. For the collected multimedia data, UE 215 may generate at least video, image and/or audio data. The metadata may further include a UE 215 generated description of the traffic event, which may be provided by the user using text or a code. The code may be generated based on a graphical user interface which provides a selection of various types of traffic events which may be selected by the driver. The UE 215 may further determine at least one of position, acceleration, velocity, or direction data as metadata for inclusion into the traffic notification. The position of UE 215 may serve as an approximate position of hazard 160, and the metadata may be used to determine a geographic impact hazard 160 may have on the surrounding road system.

Further referring to FIG. 7, UE 215 may receive a Multimedia Broadcast Multicast Service (MBMS) start session message (e.g., 660) when UE is positioned within a predefined MBMS service area (e.g., MBMS area 105) (Block 720). The start session message may include parameters (e.g., multicast IP addresses) specific to the MBMS session.

UE 215 may then receive traffic message data (e.g., multicast traffic alerts 155), which includes information regarding at least one traffic event (Block 730). The traffic message data may be received from MBMS-GW 324 via an MBMS session. The traffic message data may be based on at least one traffic notification provided by one or more UEs 215. UEs 215 may be within MBMS area 105, or may be outside MBMS area 105, when providing the traffic notification(s). Accordingly, the traffic notification(s) may be considered as crowd sourced information.

UE 215 may compare a distance to a position of the at least one traffic event described in the traffic message data to one or more thresholds (Block 740). If the distance is less than one or more thresholds (Block 740—yes), then UE 215 may provide an alert (Block 760). If the distance to a traffic event is less than a threshold (Block 740—no), UE 215 may update the distance with a new position and compare the updated distance to the at least one threshold. In an embodiment, UE 215 may make a number of comparisons to a plurality of thresholds associated with a single traffic event. The alerts provided by UE 215 may be based on the particular threshold. For example, the type of alert may depend upon the distance to the hazard. If the distance is large, the traffic alert may be less conspicuous, and offer to reroute the driver. When the distance is shorter, the traffic alert may be presented with greater urgency, and/or advise the driver of an alternate route, if available. In an embodiment, the threshold may be based upon the metadata in the notification (e.g., the type of hazard), and/or the current state of the vehicle (e.g., the vehicle position, speed, direction, anticipated route, etc.). For example, if the vehicle is traveling faster and in the direction of the hazard, the thresholds may increase to provide the driver with an advanced warning commensurate with the speed.

Figure 8:
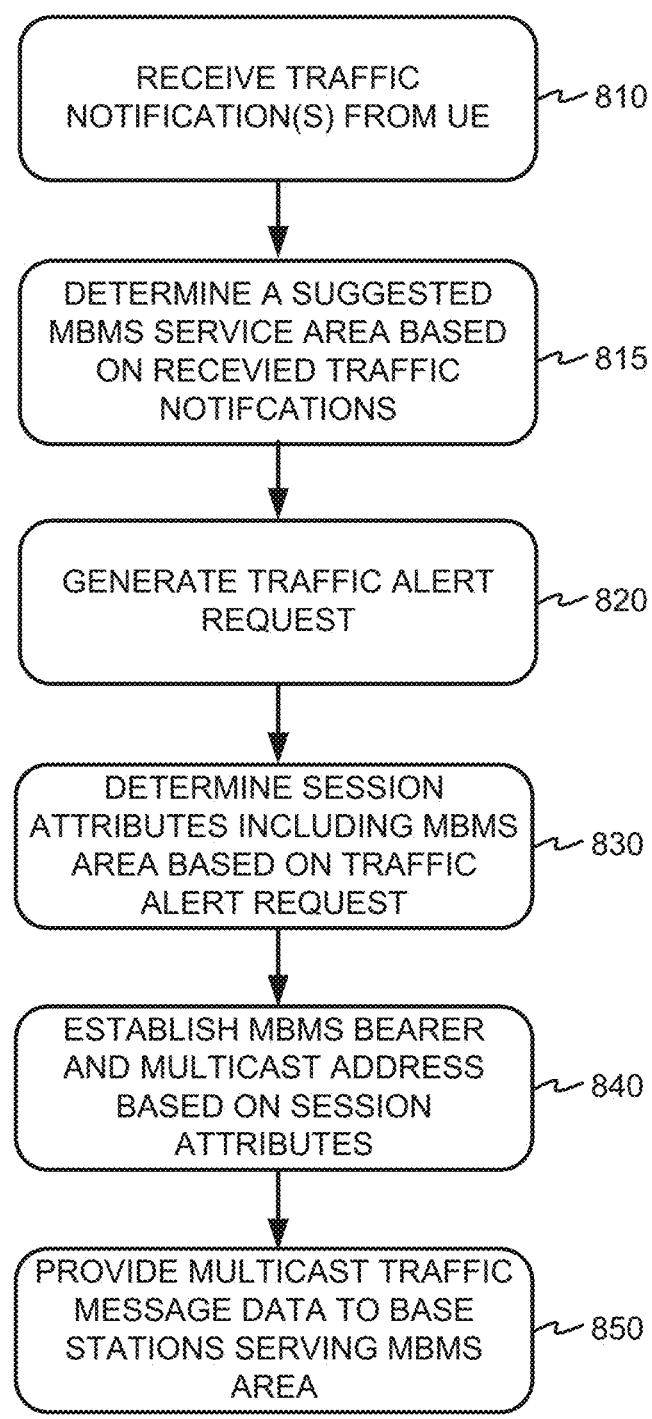
FIG. 8 is a flow chart showing an exemplary process for QoS resource allocation based on bandwidth.

FIG. 8 is a flow chart showing an exemplary process 800 for providing crowd sourced multicast traffic alerts. Process 800 may be performed by NAS 115, and actions within the process may be performed, at least in part, by NCSS 125, eUTRAN 305 (e.g., eNodeB(s) 110/360) and/or EPC 120 (which may include any subsystems within EPC 120, such as, for example, BMSC 350, MBMS-GW 324, MME 318, and/or MCE(s) 322).

NAS 115 may receive one or more traffic notifications (e.g., 150) from at least one UE 215 (Block 810). NAS 115 (e.g., NCSS 125) may analyze and consolidate the received traffic notifications. The traffic notifications may include vehicle position and thus, depending upon proximity, the approximate position of traffic hazard 160. NAS 115 (e.g., NCSS 125) may further determine a geographic impact of hazard 160, which may be based on the number of traffic notifications received, and the metadata included in the traffic notifications (e.g., event type and/or description, vehicle position, speed, direction, etc.). For example, if hazard 160 creates traffic backups, other traffic notifications 150 may be received from vehicles further away indicating that backups are being experienced.

NCSS 125 may further determine a suggested MBMS service area based on the determined geographic impact of hazard 160 (Block 815). Based on one or more traffic notifications 150, NCSS 125 may generate a traffic alert request (Block 820). The traffic alert request may include the approximate location of traffic hazard 160 and associated metadata, (such as multimedia data included in one or more traffic notifications 150), and a suggested MBMS service area. The suggested MBMS service area may be provided as a radius extending from the approximate position of traffic hazard 160, or may be more completely specified as an irregular shape outlined by coordinates in a standard reference system (e.g., WGS-84 geodetic coordinates), that may correspond to roads proximate or leading to hazard 160.

Based upon the traffic alert request, NAS 115 (e.g., BMSC 350) may determine session attributes of the MBMS session (Block 830). The session attributes may include an actual MBMS area 105 (e.g., an MBSFN area), and the eNodeB(s) 110 which may participate in the MBMS area 105. In an embodiment, sub-areas may be targeted within MBMS area 105 for different alerts depending upon the vehicles proximity to hazard 160. BMSC 350 may further determine other session attributes in addition the MBMS area 105, such as the identity of control plane nodes (e.g., MME(s) 318 and MCE(s) 322) participating in the MBMS session based on the traffic alert.

NAS 115 (e.g., MBMS-GW 324) may establish MBMS bearers (e.g., eMBMS bearers) and multicast addresses (e.g., IP multicast addresses) based upon the session attributes determined and provided by BMSC 350 (Block 840). MBMS-GW 324 may receive the multicast traffic alerts from NCSS 125 via BMSC 350, for subsequent multicast/broadcast to eNodeB(s) 110 over the established bearers.

NAS 115 (e.g., MBMS-GW 325) may provide the multicast traffic alert messages to the appropriate base stations (e.g., eNodeBs 110) serving the MBMS area 105, and the associated MBMS control signals to the MCE(s) 322, for subsequent transmission to the appropriate UE(s) 110 in the MBMS area 105 (Block 850).

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6-8, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, at a first User Equipment (UE), a Multimedia Broadcast Multicast Service (MBMS) start session message when the first UE is located within a predefined MBMS area;
   receiving traffic message data, which includes information regarding at least one traffic event, via an MBMS session, wherein the traffic message data is based on at least one traffic notification provided by at least one second UE;
   comparing a distance from the first UE to a position of the at least one traffic event described in the traffic message data to at least one threshold;
   providing at least one alert associated with the at least one traffic event based on the comparing;
   providing an interface which accepts user input for creating traffic notifications;
   receiving a command to send a traffic notification;
   generating the traffic notification, wherein the generating comprises estimating a current position of the first UE, and including the current position in the traffic notification, wherein estimating the current position further comprises ascertaining a position from at least one of a satellite position determination system or a position derived from at least one eNodeB; and
   wirelessly sending the traffic notification to a navigation alert system.

2. The method of claim 1, wherein generating the traffic notification further comprises:
   collecting multimedia data associated with the first UE; and
   including the multimedia data in the traffic notification.

3. The method of claim 2, wherein collecting multimedia data further comprises:
   generating at least one of video, image or audio data.

4. The method of claim 1, wherein generating the traffic notification further comprises:
   collecting metadata associated with the first UE; and
   including the metadata in the traffic notification.

5. The method of claim 4, wherein collecting metadata further comprises:
   generating a description of the traffic event or determining at least one of position, acceleration, velocity, or direction data associated with the first UE.

6. The method of claim 1, wherein comparing a distance further comprises:
   determining a plurality of thresholds associated with a single traffic event, where each threshold is associated with a different distance to the traffic event.

7. The method of claim 1, wherein comparing a distance further comprises:
   determining at least one threshold based on metadata.

8. A user equipment (UE), comprising:
   a wireless interface that communicates over a wireless channel;
   a memory configured to store instructions; and
   a processor, coupled to the wireless interface and the memory, wherein the processor is configured to execute the instructions stored in the memory to:
      receive a Multimedia Broadcast Multicast Service (MBMS) start session message when the UE is located within a predefined MBMS area,
      receive traffic message data, which includes information regarding at least one traffic event, via an MBMS session, wherein the traffic message data is based on at least one traffic notification provided by at least one second UE,
      compare a distance from the UE to a position of the at least one traffic event described in the traffic message data to at least one threshold,
      provide at least one alert associated with the at least one traffic event based on the comparing,
      provide an interface which accepts user input for creating traffic notifications,
      receive a command to send a traffic notification,
      generate the traffic notification, wherein the instructions to generate the traffic notification further cause the processor to: estimate a current position of the UE, and include the current position in the traffic notification, wherein the instructions to estimate the current position cause the processor to: ascertain a position from at least one of a satellite position determination system or a position derived from at least one eNodeB, and
      wirelessly send the traffic notification to a navigation alert system.

9. The UE of claim 8, wherein the instructions to generate the traffic notification comprise instructions which cause the processor to:

collect multimedia data associated with the UE, and
include the multimedia data in the traffic notification.

10. The UE of claim 9, wherein the instructions to collect multimedia data cause the processor to:
    generate at least one of video, image or audio data.

11. The UE of claim 8, wherein the instructions to generate the traffic notification comprise instructions which cause the processor to:
    collect metadata associated with the UE, and
    include the metadata in the traffic notification.

12. The UE of claim 11, wherein the instructions to collect metadata cause the processor to:
    generate a description of the traffic event or determine at least one of position, acceleration, velocity, or direction data associated with the UE.

13. The UE of claim 8, wherein the instructions to compare a distance cause the processor to:
    determine a plurality of thresholds associated with a single traffic event, where each threshold is associated with a different distance to the traffic event.

14. The UE of claim 8, wherein the instructions to compare a distance cause the processor to:
    determine at least one threshold based on metadata.

15. A non-transitory computer-readable medium comprising instructions, which, when executed by a processor, cause the processor to:
    receive, at a first User Equipment (UE), a Multimedia Broadcast Multicast Service (MBMS) start session message when the first UE is located within a predefined MBMS area;
    receive traffic message data, which includes information regarding at least one traffic event, via an MBMS session, wherein the traffic message data is based on at least one traffic notification provided by at least one second UE;
    compare a distance from the first UE to a position of the at least one traffic event described in the traffic message data to at least one threshold;
    provide at least one alert associated with the at least one traffic event based on the comparing;
    provide an interface which accepts user input for creating traffic notifications;
    receive a command to send a traffic notification;
    generate the traffic notification, wherein the instructions to generate the traffic notification further cause the processor to: estimate a current position of the first UE, and include the current position in the traffic notification, wherein the instructions to estimate the current position further cause the processor to ascertain a position from at least one of a satellite position determination system or a position derived from at least one eNodeB, and
    wirelessly send the traffic notification to a navigation alert system.

16. The non-transitory computer-readable medium of claim 15, wherein the instructions to generate the traffic notification comprise instructions which cause the processor to:
    collect multimedia data associated with the first UE, and
    include the multimedia data in the traffic notification.

17. The non-transitory computer-readable medium of claim 16, wherein the instructions to collect multimedia data cause the processor to:
    generate at least one of video, image or audio data.

18. The non-transitory computer-readable medium of claim 15, wherein the instructions to generate the traffic notification comprise instructions which cause the processor to:
    collect metadata associated with first UE, and
    include the metadata in the traffic notification.

19. The non-transitory computer-readable medium of claim 18, wherein the instructions to collect metadata cause the processor to:
    generate a description of the traffic event or determine at least one of position, acceleration, velocity, or direction data associated with the first UE.

20. The non-transitory computer-readable medium of claim 15, wherein the instructions to compare a distance cause the processor to:
    determine a plurality of thresholds associated with a single traffic event, where each threshold is associated with a different distance to the traffic event.

* * * * *